(12) United States Patent
Ieraci et al.

(10) Patent No.: US 7,378,020 B2
(45) Date of Patent: May 27, 2008

(54) FLUOROPOLYMER MEMBRANE

(75) Inventors: Robert Ieraci, Franklin Square, NY (US); Thomas K. Hartmann, Huntington Station, NY (US); David Newman, Marlton, NJ (US); Nicholas Zerilli, Flushing, NY (US)

(73) Assignee: Pall Corporation, East Hills, NY (US)

( * ) Notice: Subject to any disclaimer, the term of this patent is extended or adjusted under 35 U.S.C. 154(b) by 535 days.

(21) Appl. No.: 10/524,664

(22) PCT Filed: Jul. 23, 2003

(86) PCT No.: PCT/US03/22907

§ 371 (c)(1),
(2), (4) Date: Feb. 11, 2005

(87) PCT Pub. No.: WO2004/016341

PCT Pub. Date: Feb. 26, 2004

(65) Prior Publication Data

US 2006/0032813 A1 Feb. 16, 2006

Related U.S. Application Data

(60) Provisional application No. 60/402,974, filed on Aug. 14, 2002.

(51) Int. Cl.
 *B01D 39/00* (2006.01)
 *B01D 29/46* (2006.01)
 *B29C 65/00* (2006.01)

(52) U.S. Cl. .......................... 210/500.36; 210/500.27; 210/490; 156/247; 264/DIG. 47

(58) Field of Classification Search ........... 210/500.27, 210/500.36, 500.42, 490, 500.32, 489; 156/79, 156/89.11, 247; 428/36.91, 308.4, 422; 164/DIG. 47
See application file for complete search history.

(56) References Cited

U.S. PATENT DOCUMENTS

| | | |
|---|---|---|
| 3,207,643 A | 9/1965 | Sorg |
| 3,245,822 A | 4/1966 | Gewiss |
| 3,690,985 A | 9/1972 | Price |
| 3,814,644 A | 6/1974 | Anderson |
| 3,953,566 A | 4/1976 | Gore |
| 3,962,153 A | 6/1976 | Gore |
| 4,082,893 A | 4/1978 | Okita |
| 4,097,383 A | 6/1978 | Ohtani et al. |
| 4,187,390 A | 2/1980 | Gore |
| 4,248,924 A | 2/1981 | Okita |

(Continued)

FOREIGN PATENT DOCUMENTS

EP 0 525 630 2/1993

(Continued)

*Primary Examiner*—Ana Fortuna
(74) *Attorney, Agent, or Firm*—Leydig, Voit & Mayer, Ltd.

(57) ABSTRACT

A porous fluoropolymer membrane comprising a first surface, a second surface, nodes and free fibrils, wherein one of the first and second surfaces has a greater number of free fibrils per unit area of the surface than the other of the first and second surfaces, is disclosed. A process for preparing porous fluoropolymer membranes is also disclosed, comprising splitting a thicker membrane in a dimension different from, e.g., perpendicular to, its thickness dimension.

21 Claims, 2 Drawing Sheets

U.S. PATENT DOCUMENTS

| | | |
|---|---|---|
| 4,340,479 A | 7/1982 | Pall |
| 4,355,074 A | 10/1982 | Stemmler et al. |
| 4,385,093 A | 5/1983 | Hubis |
| 4,416,718 A | 11/1983 | Fair, Sr. |
| 4,478,665 A | 10/1984 | Hubis |
| 4,482,516 A | 11/1984 | Bowman et al. |
| 4,714,748 A | 12/1987 | Hoashi et al. |
| 4,716,074 A | 12/1987 | Hurley et al. |
| 4,760,012 A | 7/1988 | Mochizuki et al. |
| 4,760,102 A | 7/1988 | Moriyama et al. |
| 4,761,754 A | 8/1988 | Kinoshita |
| 4,902,423 A | 2/1990 | Bacino |
| 4,973,609 A | 11/1990 | Browne |
| 5,094,895 A * | 3/1992 | Branca et al. ........... 428/36.91 |
| 5,098,625 A | 3/1992 | Huang et al. |
| 5,154,827 A | 10/1992 | Ashelin et al. |
| 5,217,666 A | 6/1993 | Tamaru et al. |
| 5,234,751 A | 8/1993 | Harada et al. |
| 5,366,631 A | 11/1994 | Adiletta |
| 5,437,900 A | 8/1995 | Kuzowski |
| 5,578,373 A | 11/1996 | Kobayashi et al. |
| 5,814,405 A | 9/1998 | Branca et al. |
| 6,143,675 A | 11/2000 | McCollam et al. |
| 6,712,919 B2 * | 3/2004 | Ruefer et al. ................. 156/79 |
| 2002/0001704 A1 | 1/2002 | Ruefer et al. |

FOREIGN PATENT DOCUMENTS

| | | |
|---|---|---|
| JP | 49-060360 | 6/1974 |
| JP | 1-1756549 | 7/1989 |
| JP | 04-351645 | 12/1992 |
| WO | WO 00/61267 | 10/2000 |
| WO | WO 01/39871 | 6/2001 |

* cited by examiner

FLUOROPOLYMER MEMBRANE

CROSS-REFERENCE TO RELATED PATENT APPLICATIONS

This patent application claims the benefit of U.S. Provisional Patent Application No. 60/402,974, filed Aug. 14, 2002, which is incorporated by reference.

FIELD OF THE INVENTION

This invention relates in general to fluoropolymer membranes and a process for preparing the same, and in particular, to high flow porous fluoropolymer membranes, for example, polytetrafluoroethylene (PTFE) membranes, useful, for example, in filtering or treating of fluids, and a process for preparing such membranes.

BACKGROUND OF THE INVENTION

Fluoropolymer membranes such as PTFE membranes have several attractive properties, for example, compatibility with solvents and corrosive chemicals, ability to withstand high (e.g., sterilizing) temperatures, low pressure drop, toughness, insulating properties, non-adhesiveness, and resistance to damage, and, therefore, have found wide use in industry, for example, as a filtration medium for corrosive gases and liquids and as a separator in electrolytic cells and batteries. Although fluoropolymer membranes have these and other attractive properties, the industry has a desire to improve one or more of its properties. For example, there is a desire to improve the permeability, i.e., flow rate of fluids through the membranes.

Attempts have been made to produce highly permeable fluoropolymer membranes. Many of these attempts are based on stretching, with or without heat, to a large draw ratio, a pre-formed membrane such as a sintered fluoropolymer membrane. However, these attempts involve processes which are relatively complex, cumbersome, and/or expensive to practice; and these processes also alter (undesirably) other properties, e.g., porosity, of the membrane.

Thus, there exists a need for highly permeable porous fluoropolymer membranes. There further exists a need for thin porous fluoropolymer membranes having a desired porosity and/or pore rating. There also exists a need for a process for producing such porous fluoropolymer membranes.

The present invention provides for ameliorating at least some of the disadvantages of the prior art fluoropolymer membranes. These and other advantages of the present invention will be apparent from the description as set forth below.

BRIEF SUMMARY OF THE INVENTION

In an embodiment, a porous fluoropolymer membrane is provided comprising a first surface, a second surface, nodes, and free fibrils, wherein one of the first and second surfaces has a greater number of free fibrils per unit area of the surface than the other of the first and second surfaces.

In another embodiment, a porous fluoropolymer membrane comprises a first surface, a second surface, and free nodes, wherein one of the first and second surfaces has a greater number of free nodes per unit area of the surface than the other of the first and second surfaces.

The present invention provides thin porous fluoropolymer membranes. The membranes of the present invention have very low pressure drop and produce high flow rates. The membranes of the present invention include at least one surface containing free nodes, free fibrils, or free nodes and free fibrils. The present invention further provides a process for preparing thin porous fluoropolymer membranes. The process is relatively simple and easy to practice. The process involves removing material from a thicker membrane, for example, splitting a thicker membrane in a dimension different from, e.g., perpendicular to, its thickness dimension.

DETAILED DESCRIPTION OF THE INVENTION

The present invention provides thin porous fluoropolymer membranes. The membranes show low pressure drops. The membranes also produce high fluid flow rates. The thin membranes also have the mechanical strength suitable for many filtration and other applications.

In an embodiment, the present invention provides a first porous fluoropolymer membrane comprising nodes and fibrils having a pressure drop of less than x and a thickness less than t, wherein x and t are the pressure drop and thickness respectively of a second porous fluoropolymer membrane having nodes and fibrils and having substantially the same porosity (e.g., void volume) and/or pore rating as the first porous fluoropolymer membrane. For example, a membrane according to an embodiment of the present invention has a pressure drop of 60% of x or less and a thickness of about 60% of t or less, while the porosity and/or pore rating are (is) about 80% or more of the membrane whose pressure drop is x and thickness is t. An embodiment of a membrane of the present invention has a pressure drop of about 60% of x or less and a thickness of 60% of t or less, while the $K_L$ value (discussed below) is about 80% or more of the membrane whose pressure drop is x and thickness is t.

The pressure drop, porosity, and pore rating can be determined or expressed by methods known to those skilled in the art. Pressure drop is the difference between the upstream and downstream pressures, and can be determined, for example, by measuring the fluid (e.g., air) pressure upstream and downstream of the membrane when a fluid is flowing through the membrane. Porosity may be determined by methods known to those skilled in the art, e.g., from the specific gravity of the membrane.

Pore rating, for example, can be expressed in terms of the $K_L$ value, which relates to the pore diameter D by the equation: $D=C/K_L$ where C is constant for a combination of a membrane and a wetting liquid. When a membrane is immersed in a wetting liquid, such as isopropanol (IPA), and subsequently pressurized by air while measuring the flow of air through the membrane, and the air flow data is plotted over a range of pressures, a curve is obtained, which remains horizontal until the pressure ($K_L$) is reached, at which the air flow increases very rapidly, and the curve shows an upward trend. See, e.g., U.S. Pat. No. 4,340,479. The liquid contained in the filter medium behaves like a liquid sheet whose thickness is equal to that of the membrane. On the upstream side, air at higher pressure dissolves in the liquid sheet, diffuses through it, and is then released downstream of the membrane. When a membrane pressurized to this diffusional region is immersed in IPA, the issuing air can be observed typically as bubbles which break away at intervals from the surface of the membrane in random locations. A sudden rise in air flow occurs as the pressure is raised, and this rise corresponds to the expulsion of liquid from some of the pores of the membrane. The pressure at which this occurs (i.e., $K_L$) is an indication of the pore rating or the equivalent pore size.

The porous fluoropolymer membrane of the present invention, in embodiments, has a pore rating of about 0.03 µm or less, for example, from about 0.03 µm to about 10 µm, preferably from about 0.03 µm to about 5 µm, and more preferably from about 0.03 µm to about 1 µm. The porous fluoropolymer membrane of the present invention, in embodiments, has a $K_L$(IPA) of about 100 psi (about 689.4 kPa) or less. $K_L$ generally decreases with increasing pore rating. For example, a membrane of less than 0.03 µm pore rating has a $K_L$ (EPA) of about a membrane of about 100 psi (about 689.4 kPa), a membrane of 0.03 µm pore rating has a $K_L$ (IPA) of about 80 psi (about 551.5 kPa), a membrane of greater than 0.05 µm and less than 0.1 µm pore rating has a $K_L$ (IPA) of about 50 psi (about 344.7 kPa), a membrane of 0.1 µm pore rating has a $K_L$ (EPA) of about 30 psi (about 206.8 kPa), and a membrane of 1 µm pore rating has a $K_L$ (IPA) of about 1 psi (about 6.9 kPa).

The porous fluoropolymer membrane of the present invention, in embodiments, has a porosity of from about 75% or more, for example, from about 75% to about 95%, preferably from about 80% to about 95%, and more preferably from about 82% to about 92%. The porous fluoropolymer membrane of the present invention has a thickness of typically about 4 mils (about 100 µm) or less, and preferably from about 0.05 mil (about 1.25 µm) to about 3 mils (about 75 µm).

The porous fluoropolymer membrane of the present invention may optionally contain fillers, e.g., reactive or conductive fillers. The fillers may occupy or fill some or all of the pores of the membranes or can be incorporated into the structure of the membrane, e.g., into the nodes and/or fibrils. The membrane may contain fillers such as carbon black, graphite, metal powder, metal coated powder, glass powder, metal oxide powder, metal sulfate powder, pigment, potassium titanate, mica, clay, zeolite (natural and synthetic), molecular sieve, microfiber, polymer powder, e.g., polyvinylidene fluoride, conductive polymer, or other conductive fillers, catalytic particulates, ceramic particulates, inorganic fillers, e.g., oxides and mixed oxides of Groups 2 and 4, and ceramic fillers, e.g., $SiO_2$, $Al_2O_3$, and $TiO_2$. The fillers can have a suitable particle size, e.g., a particle size of from about 5 nm to about 500 nm, and preferably from about 10 nm to about 300 nm. The filler can be present in the membrane in any suitable amount.

The porous fluoropolymer membrane of the present invention can be prepared from any suitable fluoropolymer, which may be homopolymer, copolymer, or blends of homopolymers, copolymers, and combinations thereof. In a preferred embodiment, the fluoropolymers are perfluoropolymers. Examples of fluoropolymers include PTFE, such as fine powder PTFE, copolymers of tetrafluoroethylene, e.g., perfluoroalkoxy copolymers (such as Dupont's TEFLON PFA™ copolymers), and copolymers of tetrafluoroethylene with other vinyl monomers, e.g., hexafluoropropylene. The fluoropolymer is a crystalline material having a degree of crystallinity greater than about 80% or more. Degree of crystallinity can be determined by methods known to those skilled in the art, e.g., from differential scanning calorimetry or X-ray diffractometry.

The porous fluoropolymer membrane of the present invention is preferably prepared by splitting a thicker membrane in a dimension different from its thickness dimension. In an embodiment, the present invention provides a process for preparing embodiments of the porous fluoropolymer membrane described above, the process comprising: (a) providing a parent porous fluoropolymer membrane having a third surface and a fourth surface, nodes, and fibrils, and a thickness which is greater than the thickness of the desired porous fluoropolymer membrane; (b) bonding at least a portion of the third and/or fourth surface to a first and/or second support; (c) pulling or peeling the first support, the second support, or the first and second supports apart so that the parent porous fluoropolymer membrane splits in a dimension different from, e.g., perpendicular to, its thickness dimension, thereby forming at least one desired porous fluoropolymer membrane bonded to the first or second support; and optionally (d) separating the desired porous fluoropolymer membrane from the first or second support.

For example, in one embodiment, a process for preparing a desired porous fluoropolymer membrane comprising a first surface, a second surface, nodes, and free fibrils, wherein one of the first and second surfaces has a greater number of free fibrils per unit area of the surface than the other of the first and second surfaces, comprises (a) providing a parent porous fluoropolymer membrane having a third surface and a fourth surface, nodes, and fibrils, and a thickness which is greater than the thickness of the desired porous fluoropolymer membrane; (b) bonding at least a portion of the third and/or fourth surface to a first and/or second support; (c) pulling or peeling the first support, the second support, or the first and second supports apart so that the parent porous fluoropolymer membrane splits in a dimension different from its thickness dimension, thereby forming at least one desired porous fluoropolymer membrane bonded to the first or second support; and optionally (d) separating the desired porous fluoropolymer membrane from the first or second support.

In another embodiment, a process for preparing a desired porous fluoropolymer membrane comprising a first surface, a second surface, nodes, and free fibrils, wherein one of the first and second surfaces has a greater number of free nodes per unit area of the surface than the other of the first and second surfaces, comprises (a) providing a parent porous fluoropolymer membrane having a third surface and a fourth surface, nodes, and fibrils, and a thickness which is greater than the thickness of the desired porous fluoropolymer membrane; (b) bonding at least a portion of the third and/or fourth surface to a first and/or second support; (c) pulling or peeling the first support, the second support, or the first and second supports apart so that the parent porous fluoropolymer membrane splits in a dimension different from its thickness dimension, thereby forming at least one desired porous fluoropolymer membrane bonded to the first or second support; and optionally (d) separating the desired porous fluoropolymer membrane from the first or second support.

The parent porous fluoropolymer membrane is preferably an expanded fluoropolymer membrane, for example, an expanded PTFE membrane such as the EMFLON membrane. The parent fluoropolymer membrane may be prepared by methods known to those skilled in the art. See, e.g., U.S. Pat. Nos. 3,953,566; 4,187,390; and 3,962,153, which describe some methods for preparing porous PTFE membranes. For example, a parent porous fluoropolymer membrane can be prepared from a paste-forming fluoropolymer such as a fine powder fluoropolymer. A blend or preform comprising a fine powder PTFE resin, e.g., ASTM D 4895 Type I, grade 3, and an extrusion aid (or lubricant) is prepared by techniques known to those skilled in the art, e.g., compression molding. A fine powder PTFE resin may be obtained from Asahi Glass Fluoropolymers, Bayonne, N.J. Examples of extrusion aids include liquid hydrocarbons such as solvent naphtha and white oil, aromatic hydrocarbons, alcohols, ketones, esters, oils, e.g., mineral oil, hydrofluorocarbons, e.g., FREON™ 134a, and water, e.g., water containing a surfactant; and the preform is shaped into an article such as a sheet, e.g., by pressing or rolling. The extrusion aid is typically present in the preform in an amount of from about 14% to about 20% by weight. The preform is sometimes referred to as paste.

The resulting sheet may be pressed, rolled, or preferably calendered, e.g., between driven rolls, to a desired thickness, typically to about 2 mils (about 50 µm) or less to about 14 mils (about 350 µm) or more, and the resulting (unsintered) sheet is expanded by stretching it in one, two, three, or more directions. For example, the stretching is carried out monoaxially or biaxially. The stretching produces a microstructure containing nodes and fibrils. The stretched sheet, while in the stretched condition, is heated to amorphous lock the membrane. The heat sinters the membrane. Sintering can be complete, or typically partial. The amorphous locking process stabilizes the nodes. The amorphous locked membrane is cooled to ambient temperatures. The expansion (stretching) and sintering can also be done simultaneously. See, e.g., U.S. Pat. Nos. 4,761,754; 4,714,748; and 4,760,012. The expanded, sintered membrane may be further expanded at a temperature above the crystalline melting temperature of the highest melting PTFE present and stretched in a direction orthogonal or perpendicular to the direction of the first stretch that took place below the melt temperature of the PTFE. See, e.g., U.S. Pat. No. 5,814,405. The extrusion aid can be removed before, during, or preferably after the stretching.

The parent fluoropolymer membrane, particularly the parent PTFE membrane, preferably has a microstructure characterized by nodes and fibrils. The direction, size, and shape of the nodes may vary, and the thickness, direction, length, orientation of the fibrils may vary, depending upon the method of preparation of the parent membrane. For example, if the parent PTFE membrane is produced by uniaxial expansion, the nodes are elongated, the longer axis of the nodes being oriented generally perpendicular to the direction of expansion. The fibrils interconnecting the nodes are generally parallel to the direction of expansion. Biaxial and triaxial expansions can orient the fibrils in two or three directions, and changes can occur in the distribution, size, and shape of the nodes.

The fibrils of the parent fluoropolymer membrane, in an embodiment, are generally thin or have a narrow cross-section or diameter. The nodes can vary in size, e.g., diameter, from about 400 µm or more to about 0.05 µm or less, depending on the conditions employed in the production, e.g., during expansion. The nodes may include agglomeration of smaller nodes.

Figure 1:
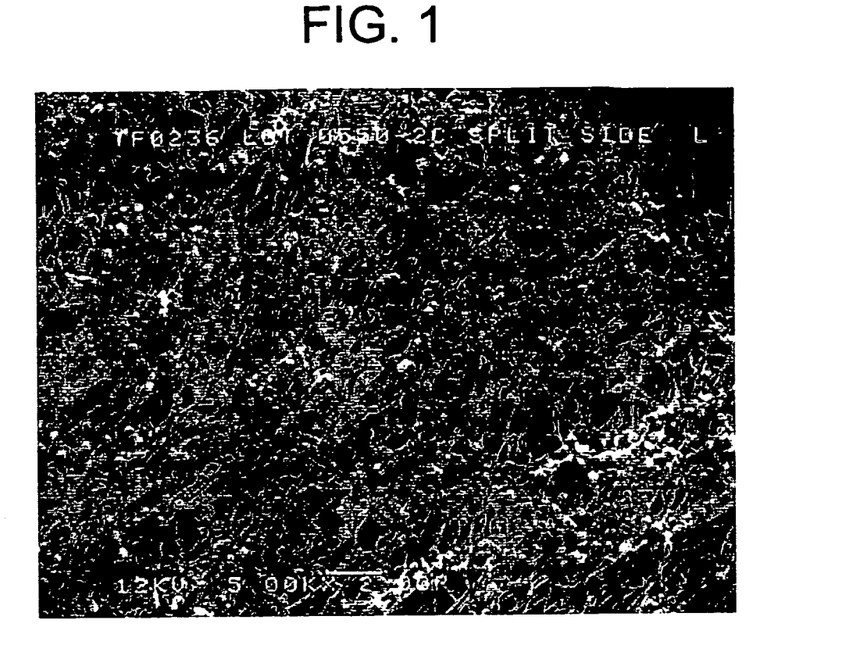
FIG. 1 depicts the scanning electron micrograph (SEM) of a relatively rough surface of a membrane in accordance with an embodiment of the present invention. This surface is created by splitting an EMFLON® (Pall Corp., East Hills, N.Y.) PTFE membrane.
Figure 2:
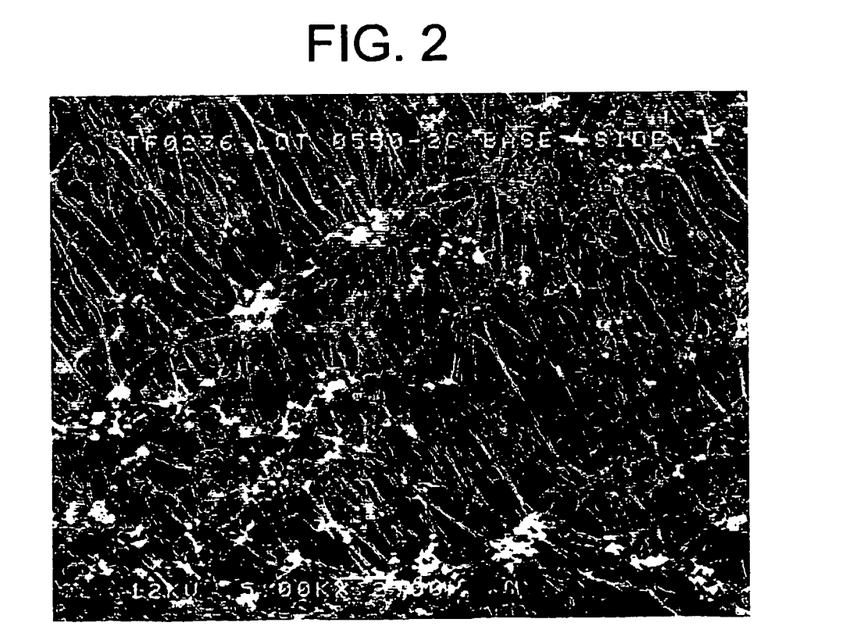
FIG. 2 depicts the SEM of the relatively smooth surface (opposing a relatively rough surface) of a membrane in accordance with an embodiment of the present invention.

The microstructure or surface morphology of a preferred parent membrane comprising nodes and fibrils is substantially as shown in FIG. 2. The parent membrane includes nodes which are generally circular particulate or granular fluoropolymer entities of about 0.1 µm or less to about 0.2 µm or more in diameter, and fibrils which are about 0.5 µm or less to about 10 µm or more in length, and about 0.02 µm or less to about 0.1 µm or more in thickness, diameter, cross-section, or width interconnecting the nodes. The nodes are composed of amorphous locked PTFE polymer. The nodes tend to form clusters having a size, e.g., diameter, of about 0.1 µm or less to about 2 µm or more. The fibrils, in embodiments, are crystalline. In certain embodiments of the parent membrane, the nodes can be elongated, i.e., having an aspect ratio greater than 1:1, for example, about 10:1, about 25:1, about 50:1, about 150:1, or greater. The nodes can be suitably distributed, e.g., parallel or randomly oriented with respect to each other. The parent fluoropolymer membrane can have a suitable pore rating, e.g., the pore rating of the desired daughter membrane. For example, the parent membrane has a pore rating of about 0.03 µm or less and higher, for example, from about 0.03 µm to about 10 µm, preferably from about 0.03 µm to about 5 µm, and more preferably from about 0.03 µm to about 1 µm.

If the porous fluoropolymer membranes are desired to contain a filler, they can be prepared from parent membranes containing the desired filler. Thus, the parent fluoropolymer membrane may contain any of the fillers described above. The filler can be incorporated by preparing the parent membrane from a fluoropolymer preform that includes the filler. The fluoropolymer powder is mixed with the filler, followed by the addition and mixing of the extrusion aid to obtain the preform. Alternatively, the filler can be wet blended with the fluoropolymer resin powder and the extrusion aid to obtain a preform.

To prepare a porous fluoropolymer membrane, in accordance with an embodiment of the present invention, a parent fluoropolymer membrane is bonded (i.e., attached, adhered, cohered, held together, fastened, affixed, laminated, sealed, or secured) to a support. The support can be any suitable material, preferably one which does not degrade, e.g., deform or tear, during the subsequent process stages, for example, during the splitting of the membrane. Examples of suitable supports include sheets of synthetic resins such as polyvinyl chloride, polyvinylidene chloride, polystyrene, polymethacrylates, polyacrylamides, polyethylene, polypropylene, polyamides, polycarbonates, cellulose esters, and polyesters, paper, cardboard, fabrics, which may be woven or non-woven, glass or metal plates, and rods, and preferably a flexible support, e.g., a non-woven polyester fabric.

The parent membrane can be bonded to the support by methods known to those skilled in the art, for example, by mechanical, chemical, solvent, and/or thermal bonding. Thus, for example, the membrane can be bonded to the support by the application of heat, pressure, glue, adhesive, chemical, and/or solvent. Typically the parent membrane is removably or temporarily bonded to the support. For example, the bonding is carried out such that the resulting (split) porous membrane can be separated or removed from the support without significantly affecting the membrane, e.g., by deforming, distorting, chemically or physically altering, or tearing. If needed, the parent membrane and/or the support can be treated to achieve the optimal bonding strength, for example, to increase the bonding strength. The parent membrane and/or support can be plasma or corona treated or chemically etched.

The parent membrane can be bonded to the support at one or both surfaces. The parent membrane can be bonded to the support at a portion of, or the entire of, one or both surfaces. In a preferred embodiment, the parent membrane is bonded at both surfaces to two non-woven polyester fabric layers by heat sealing.

The two layers are pulled (or peeled) apart, and the parent porous membrane splits, cracks, or cleaves in a dimension different from its thickness dimension (e.g., direction or plane). The membrane may be split at any point (loci) of its thickness, and preferably at the mid-point. In another embodiment, one of the surfaces of the parent membrane can be bonded to a support and the second surface is non-bonded. The non-bonded surface can be pulled away from the bonded surface to split the membrane.

The pulling or peeling operation may include bending the support and/or the parent membrane, thereby making an angle, e.g., acute angle, with each other. If the bonding strength between the support and the parent membrane is sufficient, the parent membrane is subject to an internal cleavage, thereby resulting in a splitting of the membrane sheet into two membrane sheets comprising the porous fluoropolymer membranes of the present invention. The splitting can occur in a dimension angled from the thickness dimension. In a preferred embodiment, the splitting occurs in a dimension substantially orthogonal to the thickness dimension. The membrane can be left on the support to obtain a supported membrane (or laminate or composite). Alternatively, the support(s) can be removed to yield unsupported membranes.

For a sheet membrane having a thickness, width, and length, the membrane can be split in a dimension perpendicular to its thickness dimension, and parallel to its length or width dimension.

In a further embodiment, the present invention provides a porous fluoropolymer membrane comprising a first surface, a second surface, and a bulk disposed between the first and second surfaces, wherein the first and second surfaces have free nodes and free fibrils and the bulk has interconnected nodes and interconnecting fibrils. Such a membrane can be produced, for example, by repeated, e.g., two, three, four, or more times, splitting. Thus, for example, the parent fluoropolymer membrane can be split to produce a daughter membrane comprising a first surface, a second surface, nodes, and free fibrils, wherein one of the first and second surfaces has a greater number of free fibrils per unit area of the surface than the other of the first and second surfaces. The surface having the greater number of free fibrils per unit area can be bonded to a support, and the two layers can be pulled apart, thereby splitting the daughter membrane and obtaining a first grandchild membrane having two surfaces each including free nodes and free fibrils, and a second grandchild membrane having a surface including free nodes and/or free fibrils.

The present invention provides a process for splitting a fluoropolymer membrane comprising: (a) providing a fluoropolymer membrane having a first surface and a second surface and a thickness; (b) bonding at least a portion of the first or second surface of the fluoropolymer membrane to a first or second support; (c) pulling or peeling the first support, the second support, or the first and second supports apart so that the fluoropolymer membrane splits in a dimension different from, e.g., perpendicular to, its thickness dimension to provide a fluoropolymer membrane having a third surface and a fourth surface; and optionally (d) bonding at least a portion of the third or fourth surface of the fluoropolymer membrane from (c) to a third or fourth support; and (e) pulling or peeling the third support, the fourth support, or the third and fourth supports apart so that the fluoropolymer membrane from (d) splits in a dimension different from, e.g., perpendicular to, the thickness dimension.

During the splitting, in an embodiment, the split or crack propagates in a dimension (direction) perpendicular to the thickness dimension (direction) and parallel to the length or width.

The present invention further provides a process for treating a PTFE membrane comprising: (a) providing a PTFE membrane having a first surface and a second surface, and a thickness providing a distance between the first and second surfaces; (b) bonding at least a portion of the first or second surface of the PTFE membrane to a first or second support; and (c) increasing the distance between the first and second surfaces so that the PTFE membrane splits in a dimension different from, e.g., perpendicular to, its thickness dimension.

The present invention provides a process for preparing a porous fluoropolymer membrane comprising: (a) providing a preform comprising a fluoropolymer and an extrusion aid; (b) shaping the preform into a sheet having a thickness; (c) pressing, rolling, or calendering the sheet from (b); (d) stretching the sheet from (c); (e) heating the sheet from (d); and (f) splitting the sheet from (e) in a dimension different from, e.g., perpendicular to, its thickness dimension to obtain a sheet thinner than the sheet from (e).

The present invention further provides a process for preparing a porous fluoropolymer membrane comprising: (a) providing a preform comprising a fluoropolymer and an extrusion aid; (b) shaping the preform into a sheet having a thickness; (c) pressing, rolling, or calendering the sheet from (b); (d) stretching and heating the sheet from (c); and (e) splitting the sheet from (d) in a dimension different from, e.g., perpendicular to, its thickness dimension to obtain a sheet thinner than the sheet from (d).

The preform can be prepared by compression molding. The sheet can be prepared by paste extrusion, and the resulting sheet is preferably calendered, and the sheet is stretched monoaxially or biaxially. The heating is carried out so that sintering, typically partial sintering, of the sheet occurs. The extrusion aid can be removed after, during, or preferably prior to stretching.

Alternatively, a porous membrane of the present invention may be prepared from a parent sheet such as a sheet prepared from a preform including a fluoropolymer and an extrusion aid. The sheet may be calendered, pressed, or rolled to a desired thickness. The sheet can be split in a dimension (or direction) perpendicular to its thickness dimension. The resulting sheet or sheets are stretched to high draw ratios and heated. The membrane can be stretched with heating. The extrusion aid may be removed after, during, or preferably prior to splitting. The present invention provides a process for preparing a porous fluoropolymer membrane comprising: (a) providing a preform comprising a fluoropolymer and an extrusion aid; (b) shaping the preform into a sheet having a thickness; (c) pressing, rolling, or calendering the sheet from (b); (d) splitting the sheet from (b) or (c) in a dimension different from, e.g., perpendicular to, its thickness dimension to obtain a sheet thinner than the sheet from (b) or (c); (e) stretching the sheet from (d); and (f) heating the sheet from (e).

The present invention further provides a process for preparing a porous fluoropolymer membrane comprising: (a) providing a preform comprising a fluoropolymer and an extrusion aid; (b) shaping the preform into a sheet having a thickness; (c) optionally pressing, rolling, or calendering the sheet from (b); (d) splitting the sheet from (b) or (c) in a dimension different from, e.g., perpendicular to, its thickness dimension to obtain a sheet thinner than the sheet from (b) or (c); and (e) stretching and heating the sheet from (d).

The present invention further provides membranes which are obtainable or prepared by the processes described above.

Embodiments of the membranes of the present invention have a surface morphology or microstructure characterized by the presence of free fibrils, free nodes, or both. In an embodiment, the present invention provides a porous fluoropolymer membrane comprising a first surface, a second surface, nodes, and free fibrils, wherein one of the first and second surfaces has a greater number of free fibrils per unit area of the surface than the other of the first and second surfaces. In another embodiment, the present invention provides a porous fluoropolymer membrane comprising a first surface, a second surface, and free nodes, wherein one of the first and second surfaces has a greater number of free nodes per unit area of the surface than the other of the first and second surfaces. In yet another embodiment, the present invention provides a porous fluoropolymer membrane comprising a first surface, a second surface, free nodes, and free fibrils, wherein one of the first and second surfaces has a greater number of free nodes and free fibrils per unit area of the surface than the other of the first and second surfaces.

The splitting creates two new surfaces. The new (split) surfaces have a morphology distinct from the surface existing prior to splitting (the other surface) or the bulk (interior) of the membrane. For example, each of the new surfaces has a greater number of free fibrils per unit area than the bulk or the other surface.

Fibrils may have a plurality of ends, e.g., two, three, or more ends. Free fibrils are fibrils having at least two ends one of which is attached (connected) to a node and at least one other end is unattached, unconnected, or free. The new surfaces have a greater number of free nodes per unit area than the bulk or the other surface. Free nodes are nodes which have a reduced number of attached fibrils, e.g., free fibrils or interconnecting fibrils. Free nodes may have one, two, three, four, or more free fibrils attached. Free nodes are free or substantially free of interconnecting fibrils. Interconnected nodes are nodes connected to other nodes by interconnecting fibrils. Interconnected nodes are free or substantially free of free fibrils.

In embodiments, the new surface has a greater number of free nodes as well as free fibrils than the other surface. The free fibrils arise from the rupturing of the interconnecting fibrils during the splitting. The interconnecting fibrils undergo stretching during the splitting of the membrane, and the fibrils when stretched beyond the break point rupture.

In another embodiment, the present invention provides a porous fluoropolymer membrane comprising a first surface, a second surface, fibrils, and free nodes, wherein one of the first and second surfaces has longer fibrils and a greater number of free nodes per unit area of the surface than the other of the first and second surfaces.

In a further embodiment, the present invention provides a porous fluoropolymer membrane comprising a first surface, a second surface, and free fibrils, wherein one of the first and second surfaces has thinner free fibrils than the other of the first and second surfaces. The free fibrils on the new surface (created by splitting) may be thinner than the free fibrils of the other surface. The cross-section of the free fibrils may be smaller than the free fibrils of the other surface.

In a still further embodiment, the present invention provides a porous fluoropolymer membrane comprising a first surface, a second surface, free nodes, and free fibrils, wherein one of the first and second surfaces has thinner free fibrils and a greater number of free nodes per unit area of the surface than the other of the first and second surfaces.

In another embodiment, the present invention provides a porous fluoropolymer membrane comprising a first surface, a second surface, nodes, and fibrils, wherein one of the first and second surfaces has longer fibrils than the other of the first and second surfaces and the nodes on the first and second surfaces are of substantially same shape or different.

In yet another embodiment, the present invention provides a porous fluoropolymer membrane comprising a first surface, a second surface, and interconnected nodes, wherein one of the first and second surfaces has a smaller number of interconnected nodes per unit area of the surface than the other of the first and second surfaces.

In still another embodiment, the present invention provides a porous fluoropolymer membrane comprising a first surface, a second surface, interconnected nodes, and fibrils, wherein one of the first and second surfaces has thinner or longer fibrils and a smaller number of interconnected nodes per unit area of the surface than the other of the first and second surfaces.

In yet another embodiment, the present invention provides a porous fluoropolymer membrane comprising a first surface, a second surface, and fibrils, wherein one of the first and second surfaces has longer and thinner fibrils than the other of the first and second surfaces.

In still another embodiment, the present invention provides a porous fluoropolymer membrane comprising a first surface, a second surface, and a bulk disposed between the first and second surfaces, wherein the first and second surfaces have free nodes and the bulk has interconnected nodes. The surface that has free nodes may also have interconnected nodes.

In certain embodiments, the interconnecting fibrils of the new (or split) surface are thinner than the interconnecting fibrils of the other surface. In other embodiments, the interconnecting fibrils of the new (or split) surface are longer than the interconnecting fibrils on the other surface. In yet other embodiments, the interconnecting fibrils of the new (or split) surface are thinner and longer than the interconnecting fibrils on the other surface. It is believed that, during the splitting, the interconnecting fibrils present at the splitting location and/or in the region immediately adjacent to the splitting location undergo stretching. Those interconnecting fibrils stretched below their break points remain as interconnecting fibrils, and the fibrils do not elastically recover significantly after the stress of splitting is removed. When split at a temperature below the amorphous locking temperature of the PTFE, e.g., at ambient temperature, it is believed that only the interconnecting fibrils (which are crystalline) undergo stretching and elongation. The nodes, which are primarily amorphous locked, do not undergo stretching if the splitting was carried out at ambient temperatures. Stretching of the nodes is expected to occur if splitting is carried out at a temperature which is higher than the amorphous locking temperature of the parent membrane. In embodiments, as the interconnecting fibrils are stretched, the nodes separate from each other.

In a further embodiment, the present invention provides a porous fluoropolymer membrane comprising a first surface, a second surface, and a bulk disposed between the first and second surfaces, wherein the first and second surfaces have free nodes and free fibrils and the bulk has interconnected nodes and interconnecting fibrils.

The porous fluoropolymer membranes of the present invention, particularly the new surface created by splitting, may have higher degree of crystallinity than the parent membrane. Without being bound to any particular theory or mechanism, it is believed that, as the fibrils are elongated during splitting, the crystallinity of the fibrils in the region of splitting increases; and that the interconnecting fibrils of the new surface have a greater degree of macromolecular orientation than the interconnecting fibrils in the bulk or other surface.

The porous fluoropolymer membranes of the present invention retain much of the porosity and pore rating, e.g., as shown by the $K_L$ values, of the parent membrane and at the same time show much lower pressure drop than the parent membrane. The membranes of the present invention retain about 80% or more, preferably 90% or more, and more preferably about 95% or more of the pore rating and/or porosity of the parent membrane, and at the same time, have a pressure drop of about 80% or less, preferably 60% or less, and more preferably about 50% or less than the parent membrane. The porous fluoropolymer membranes of the present invention have a thickness of about 80% or less, preferably about 60% or less, and more preferably about 50% or less, than the parent membrane.

The porous fluoropolymer membranes of the present invention retain much of the particle, e.g., bacterial or bead, retention capability of the parent membrane. In an embodiment, the membrane has the same or substantially same particle retention capability as the parent membrane. The particle retention, e.g., bacterial retention, capability is the same or substantially the same regardless of the side, i.e., the smooth side or the rough side, facing the challenge. Bacterial retention capability may be tested by challenging the membrane with a suitable bacteria. For example, a membrane having a pore rating of about 0.45 μm can be challenged with *Serratia marcescens*; a membrane having a pore rating of about 0.2 μm can be challenged with *Bravundamonas diminuta*; and a membrane having a pore rating of about 0.1 μm can be challenged with *Acholeplasma laidlawii*.

The porous fluoropolymer membranes of the present invention have low pressure drops. In an embodiment, a porous fluoropolymer membrane of the present invention has a thickness of about 60% or less, a pressure drop of about 60% or less, and a $K_L$ (IPA) value of about 80% or more relative to the parent membrane. For example, one embodiment of the porous fluoropolymer membrane of the present invention has a thickness of about 1.25 mils (31.3 μm), a $K_L$ (EPA) of from about 27 psi (about 186.1 kPa) to about 30 psi (about 206.8 kPa), and a pressure drop of from about 1.2 inches (about 30.4 mm) to about 1.4 inches (about 35.6 mm) of Hg, whereas the parent membrane has a thickness of about 2.00 mils (about 50 μm), a $K_L$ (IPA) of from about 30 psi (about 206.8 kPa) to about 31 psi (about 213.7 kPa) and a pressure drop of from about 2.5 inches (about 63.5 mm) to about 2.7 inches (about 68.6 mm) of Hg.

The present invention further provides porous fluoropolymer membranes having a surface which has a rough texture which is believed to be due to presence of free fibrils and/or free nodes. Surface roughness can be measured or determined by methods known to those skilled in the art. For example, the roughness can be determined by optical profilometry. Instruments such as, but not limited to, the WYKO™ Profilers available from Veeco Instruments Inc., Plainview, N.Y., can be employed to measure the surface roughness. For example, surface roughness can be expressed in terms of the roughness average (Ra), the root mean square roughness (Rq), the maximum height of the surface profile (Rt), or the average maximum height of the surface profile (Rz).

In accordance with an embodiment, the present invention provides a porous fluoropolymer membrane having a Ra of greater than about 700 nm (0.7 μm), a Rq greater than about 800 nm (0.8 μm), a Rz greater than about 6.5 μm (6,500 nm), or a Rt greater than about 7 μm (7,000 nm). The porous fluoropolymer membrane preferably has a Ra of greater than about 900 nm (0.9 μm), e.g. from about 1000 nm (1.0 μm) to about 1300 nm (1.3 μm) or more, a Rq greater than about 1200 nm (1.2 μm), e.g., from about 1300 nm (1.3 μm) to about 1800 nm (1.8 μm) or more, a Rz greater than about 8 μm (8,000 nm), e.g., from about 9 μm (9,000 nm) to about 12 μm (12,000 nm) or more, or a Rt greater than about 9 μm (9,000 nm), e.g., from about 10 μm (10,000 nm) to about 14 μm (14,000 nm) or more. As an example, one 3-dimensional interactive image of the split surface of a membrane in accordance with the present invention depicts a membrane surface having a Ra of 1.27 μm (1,270 nm), a Rq of 1.61 μm (1,610 nm), and a Rt of 11.53 μm (11,530 nm). For comparison, a 3-dimensional interactive image of a relatively smooth surface of the parent membrane depicts an Ra of 630.35 nm (0.63 μm), a Rq of 793.83 nm (0.79 μm), and a Rt of 7.03 μm (7,030 nm).

Figure 3:
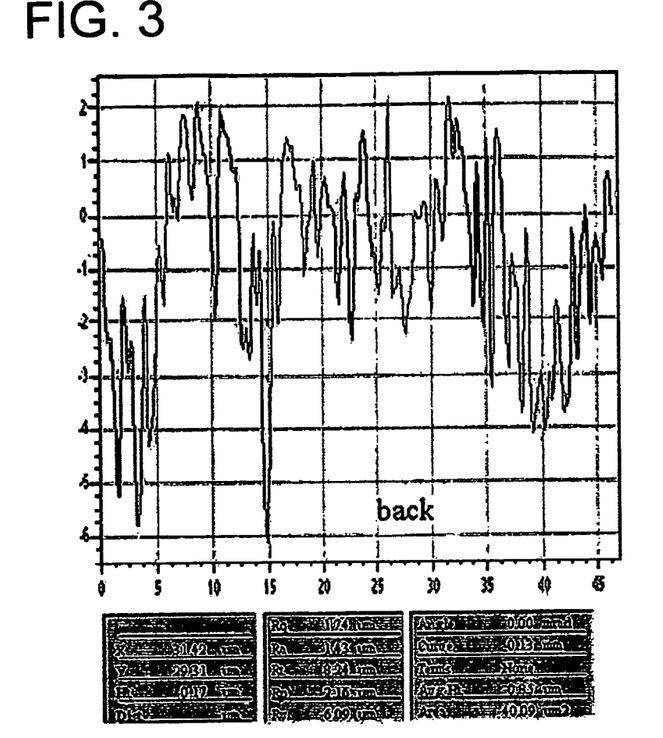
FIG. 3 depicts the surface profile, as determined by the scanning white light interference microscopy, of the relatively rough surface (split surface) of a porous PTFE membrane in accordance with an embodiment of the present invention. The x-axis represents the length of the membrane and the y-axis represents the distance from y=0, the mean linear surface.
Figure 4:
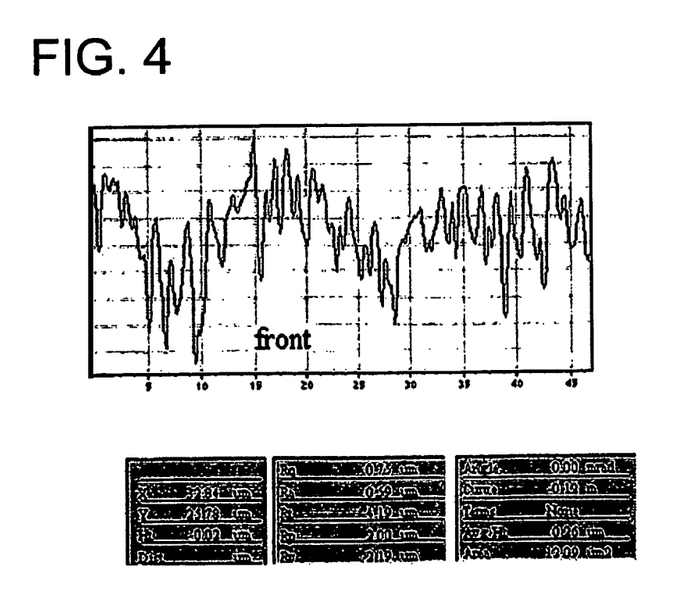
FIG. 4 depicts the surface profile, as determined by the scanning white light interference microscopy, of the relatively smooth surface opposing the relatively rough surface of a membrane prepared in accordance with an embodiment of the present invention. The x-axis represents the length of the membrane and the y-axis represents the distance from y=0, the mean linear surface.

FIG. 3 depicts the surface profile, as determined by the use of scanning white light interference microscopy, of the rough (split) surface of a membrane in accordance with an embodiment of the present invention. The x-axis represents the length of the membrane and the y-axis represents the distance from y=0, which is the mean linear surface. Rp is the maximum profile height over the mean linear surface and Rv is the maximum depth under the mean linear surface. It is clear that the split surface has a rough profile. The surface has a Rq of 1.74 μm (1,740 nm), a Ra of 1.43 μm (1,430 nm), a Rt of 8.24 μm (8,240 nm), a Rp of 2.16 μm (2,160 nm), and a Rv of −6.09 μm (−6,090 nm). The average height is −0.85 μm (−850 nm). The area is −40.09 μm² (−40.09×10⁶ nm²). In contrast, the opposing surface is relatively smooth as shown in FIG. 4. The smooth surface has a Rq of 0.75 μm (750 nm), a Ra of 0.59 μm (590 nm), a Rt of 4.19 μm (4,190 nm), a Rp of 2.00 μm (2000 nm), and a Rv of −2.19 μm (−2,190 nm). The area is 12.09 μm² (12.09×10⁶ nm²). The average height is 0.26 μm (260 nm).

The present invention further provides a device, e.g., filter device, comprising a membrane of the present invention. The device can be in any suitable form. For example, the device can include a filter element comprising the membrane, e.g., in a substantially planar or pleated form. In an embodiment, the element can have a hollow generally cylindrical form. If desired, the device can include the filter element in combination with upstream and/or downstream support or drainage layers. The device can include a plurality of membranes, e.g., to provide a multilayered filter element, or stacked to provide a membrane module. Filter cartridges can be constructed by including a housing and endcaps to provide fluid seal as well as at least one inlet and at least one outlet. The devices can be constructed to operate in crossflow or tangential flow modes as well as dead-end modes. Accordingly, the fluid to be treated can be passed, for example, tangentially to the membrane surface, or passed perpendicular to the membrane surface.

The present invention further provides a laminate or composite comprising a support (which may be porous or non-porous) and at least one porous fluoropolymer described above. In some embodiments, two or more split or separated membranes can be utilized to provide a filter comprising the two or more membranes. A filter comprising, for example, two split or separated membranes can comprise both membranes split from the same parent membrane (with the new surfaces facing each other, facing away from each other, or with a new surface of one membrane contacting the non-split surface of the other membrane), or membranes from different parents can be so combined.

The porous fluoropolymer membranes of the present invention find use in a number of applications such as microfiltration, ultrafiltration, hyperfiltration, gas (e.g., air) separation or treatment, including filtration of gases and liquids (including corrosive gases and liquids) to remove particulates, venting of gases from liquids, gas contactors wherein a gas is molecularly transferred to another liquid or gas, membrane reactors, membrane mediated catalyzed reactions, battery or electrolytic cell separators, concentration of fruit juices, separation and purification in the fermentation industry, prosthetic material, and as a support material for composite membranes.

The following illustrative examples further illustrate the present invention but, of course, should not be construed as in any way limiting its scope.

EXAMPLE 1

This Example illustrates an advantage of a porous fluoropolymer membrane in accordance with an embodiment of the present invention, that is, a low pressure drop.

Three samples of EMFLON PTFE membrane of 0.2 µm pore rating are split in a dimension perpendicular to its thickness dimension. The thickness, $K_L$, and Dp28 (28 refers to the face velocity of the pressure drop test fluid in std.cu.ft./min./sq.ft.) values of the parent membrane samples and of the resulting split membranes are measured and are set forth below.

| Sample No. | Parent Membrane Thickness, mils (µm) | Split Membrane A Thickness, mils (µm) | Split Membrane B Thickness, mils (µm) |
|---|---|---|---|
| 1 | 5.07 (126.8) | 2.25 (56.3) | 3.40 (85.0) |
| 2 | 5.03 (125.8) | 2.17 (54.3) | 3.38 (84.5) |
| 3 | 5.42 (135.5) | 2.24 (56.0) | 3.06 (76.5) |
|  | Parent Membrane $K_L$ (IPA), psi (kPa) | Split Membrane A $K_L$ (IPA), psi (kPa) | Split Membrane B $K_L$ (IPA), psi (kPa) |
| 1 | 21.4 (147.5) | 22.6 (155.8) | 21.3 (146.9) |
| 2 | 24.0 (165.5) | 23.8 (164.1) | 21.9 (151.0) |
| 3 | 24.8 (171.0) | 23.1 (159.3) | 22.8 (157.2) |
|  | Parent Membrane Dp28, inches of Hg (mm of Hg) | Split Membrane A Dp28, inches of Hg (mm of Hg) | Split Membrane B Dp28, inches of Hg (mm of Hg) |
| 1 | 5.6 (142.2) | 2.4 (61.0) | 2.7 (68.6) |
| 2 | 6.5 (165.1) | 2.6 (66.0) | 2.9 (73.7) |
| 3 | 7.0 (177.8) | 2.8 (71.1) | 2.5 (63.5) |

The average $K_L$ (IPA) of the parent membrane is 23.3 psi (160.7 kPa) and the average $K_L$ (IPA) of the split membranes are 23.2 psi (160.0 kPa) for A and 22.0 psi (151.7 kPa) for B. The average Dp28 of the parent membrane is 6.4 inches (162.6 mm) of Hg and the average Dp28 of the split membranes are 2.6 inches (66.0 mm) of Hg for A and 2.7 inches (68.6 mm) of Hg for B. The foregoing shows that the membranes prepared in accordance with the present invention retain much of the porosity as shown by the $K_L$ (EPA) values and have lower pressure drops than the parent membrane.

EXAMPLE 2

This Example further illustrates an advantage of a porous fluoropolymer membrane in accordance with an embodiment of the present invention, that is, a low pressure drop.

Three samples of EMFLON PTFE membrane of 0.1 µm pore rating are split in a dimension perpendicular to its thickness dimension. The thickness, $K_L$ (IPA), and Dp28 values of the parent membrane samples and of the resulting split membranes are measured and are set forth below.

| Sample No. | Parent Membrane Thickness, mils (µm) | Split Membrane A Average Thickness 1.25 mils (31.3 µm) | Split Membrane B Average Thickness 1.25 mils (31.3 µm) |
|---|---|---|---|
| 1 | 1.96 (49.0) | | |
| 2 | 2.00 (50.0) | | |
| 3 | 1.98 (49.5) | | |
|  | Parent Membrane $K_L$ (IPA), psi (kPa) | Split Membrane A $K_L$ (IPA), psi (kPa) | Split Membrane B $K_L$ (IPA), psi (kPa) |
| 1a | 30.7 (211.7) | 27.1 (186.9) | 28.8 (198.6) |
| 1b | 30.7 (211.7) | 27.1 (186.9) | 28.8 (198.6) |
| 1c | 31.3 (215.8) | 27.1 (186.9) | 28.8 (198.6) |
| 2a | | 27.0 (186.2) | 29.9 (206.2) |
| 2b | | 28.0 (193.1) | 28.4 (195.8) |
|  | Parent Membrane Dp28, inches of Hg (mm of Hg) | Split Membrane A Dp28, inches of Hg (mm of Hg) | Split Membrane B Dp28, inches of Hg (mm of Hg) |
| 1a | 2.5 (63.5) | 1.3 (33.0) | 1.2 (30.5) |
| 1b | 2.6 (66.0) | 1.4 (35.6) | 1.3 (33.0) |
| 1c | 2.7 (68.6) | 1.4 (35.6) | 1.4 (35.6) |
| 2a | | 1.3 (33.0) | 1.3 (33.0) |
| 2b | | 1.3 (33.0) | 1.3 (33.0) |

The average $K_L$ (EPA) of the parent membrane is 30.9 psi (213.0 kPa) and the average $K_L$ (IPA) of the split membranes are 27.2 psi (187.5 kPa) for A and 28.9 psi (199.3 kPa) for B. The average Dp28 of the parent membrane is 2.6 inches (66.0 mm) of Hg and the average Dp28 of the split membrane is 1.34 inches (34.0 mm) of Hg for A and 1.3 inches (33.0 mm) of Hg. The foregoing shows that the membranes prepared in accordance with the present invention retain much of the porosity as shown by the $K_L$ (EPA) values and have lower pressure drops than the parent membrane.

EXAMPLE 3

This Example illustrates that the retention efficiency of the split PTFE membrane is substantially the same as that of the parent membrane.

Two pieces (142 mm diameter) of EMFLON PTFE membrane (pore rating 0.2 µm) and eight pieces (142 mm diameter) of PTFE membranes prepared by splitting the EMFLON PTFE membranes are tested for particle retention capabilities by the use of latex beads of 0.2 μm mean spherical particle diameter. A HSLIS Counter M50, manufactured by Particle Measuring Systems, Boulder, Colo., is used to monitor particulate count in the upstream and downstream fluids. The particulate count is monitored at 5 minute intervals, with a one minute delay between the intervals. The flow rate is maintained at 300 mL/min, and the test stand is set at 2 gpm (7.75 L/min). A back pressure of at least 15 psi (103.4 kPa) is maintained.

Prior to testing each membrane, a system DI water level of less than 5 N/mL is achieved. The particulate levels downstream of the membranes are also monitored until baseline levels below 10 N/mL are established. A 5 mL syringe filled with a 0.208 μm latex beads suspension is injected into the system at a rate of 1 mL/hr. The DI water system is supervised until the particulate levels are greater than 10,000 N/mL for 0.05 μm particles and smaller for 30 minutes. The particulate levels exiting the membranes are monitored for 1 hour to examine the membranes' filtering efficiency. The test is switched back to upstream to confirm a particulate level of at least 10,000 N/mL passing through the membranes. The results obtained are set forth below.

| Sample | Upstream Accumulative Average | Downstream Accumulative Average | Log Reduction Value (LRV) |
|---|---|---|---|
| parent 1 | 8568.9 | 30.6 | 2.4 |
| parent 2 | 9614.9 | 1.1 | 3.9 |
| split 1 | 10651.1 | 11.0 | 3.0 |
| split 2 | 10379.8 | 3.7 | 3.4 |
| split 3 | 9041.8 | 4.3 | 3.3 |
| split 4 | 10386.6 | 3.7 | 3.4 |
| split 5 | 10459.2 | 5.6 | 3.3 |
| split 6 | 10045.9 | 3.5 | 3.5 |
| split 7 | 9209.6 | 2.2 | 3.6 |
| split 8 | 10274.3 | 1.8 | 3.8 |

The foregoing shows that the process of splitting does not significantly alter the membrane's particle retention capability.

EXAMPLE 4

This Example illustrates that bacterial retention capability of a split PTFE membrane, in accordance with an embodiment of the invention, is substantially the same as that of its parent membrane. This Example further illustrates a property of the membrane that the bacterial retention capability is the same regardless whether the rough side or the smooth side of the split membrane faces the bacterial challenge.

Two pieces (142 mm diameter) of EMFLON PTFE membrane (pore rating 0.2 μm) and six pieces (142 mm diameter) of PTFE membranes prepared by splitting the EMFLON PTFE membranes are tested for bacterial retention capabilities by the use of *B. diminuta*. Splitting produces membranes, each having a rough side and a smooth side. In each test, either the rough side or the smooth side of the membrane is challenged (upstream) with the bacteria. Bacterial levels upstream and downstream of the membranes are monitored by cell culturing the upstream and downstream samples in a petri dish and counting the number of colonies present. The membranes are effective in achieving titer reduction. The results obtained are set forth below:

| Sample | Bacterial Challenge Side | Total Challenge (counts) | Total Recovery (counts) | Titer Reduction[#] |
|---|---|---|---|---|
| 1. Parent | side 1 | $2.1 \times 10^7$ | 1 | $\sim 2.1 \times 10^7$ |
| 2. Parent | side 2 | $2.1 \times 10^7$ | 0 | $>2.1 \times 10^7$ |
| 3. Split 1 | smooth | $2.1 \times 10^7$ | 1 | $\sim 2.1 \times 10^7$ |
| 4. Split 1 | rough | $2.1 \times 10^7$ | 0 | $>2.1 \times 10^7$ |
| 5. Split 2 | rough | $1.7 \times 10^7$ | 0 | $>1.7 \times 10^7$ |
| 6. Split 2 | smooth | $1.7 \times 10^7$ | 0 | $>1.7 \times 10^7$ |
| 7. Split 3 | smooth | $1.7 \times 10^7$ | 0 | $>1.7 \times 10^7$ |
| 8. Split 3 | rough | $1.7 \times 10^7$ | 0 | $>1.7 \times 10^7$ |

[#]Titer reduction is the ratio of the bacterial concentration in the influent stream to that in the effluent stream.

The foregoing shows that the process of splitting does not significantly alter the membrane's bacterial retention capability. The bacterial retention capability is substantially the same regardless of the side, rough or smooth, facing the challenge.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A porous fluoropolymer membrane comprising a first surface, a second surface, nodes, and free fibrils, the free fibrils having at least two ends, one of which is attached to a node and at least one other end which is unattached to a node; wherein one of the first and second surfaces has a greater number of free fibrils per unit area of the surface than the other of the first and second surfaces.

2. The porous fluoropolymer membrane, of claim 1, comprising a first surface, a second surface, free nodes, and free fibrils, wherein one of the first and second surfaces has a greater number of free nodes and free fibrils per unit area of the surface than the other of the first and second surfaces.

3. The porous fluoropolymer membrane of claim 1, comprising a first surface, a second surface, free nodes, and free fibrils, wherein one of the first and second surfaces has thinner free fibrils and a greater number of free nodes per unit area of the surface than the other of the first and second surfaces.

4. The porous fluoropolymer membrane of claim 1, which includes PIFE.

5. The porous fluoropolymer membrane of claim 1, which includes a copolymer of tetrafluoroethylene.

6. The porous fluoropolymer membrane of claim 1, having an average pore diameter of from about 0.03 μm to about 10 μm.

7. The porous fluoropolymer membrane of claim 1, having a porosity of from about 80% to about 90%.

8. The porous fluoropolymer membrane of claim 1, having a thickness of about 4 mils (about 100 μm) or less.

9. The porous fluoropolymer membrane of claim 1, having a thickness of from about 0.05 mil (about 1.25 μm) to about 3 mils (about 75 μm).

10. The porous fluoropolymer membrane of claim 1, having a $K_L$ (IPA) of about 100 psi (about 689 kPa) or less.

11. The porous fluoropolymer membrane of claim 1, having a $K_L$ (IPA) of about 30 psi (about 207 kPa) or less.

12. The porous fluoropolymer membrane of claim 1, including a filler.

13. A composite comprising a support and the porous fluoropolymer membrane of claim 1.

14. A porous fluoropolymer membrane comprising a first surface, a second surface, and free nodes, the free nodes having free fibrils attached, the free fibrils having a least two ends, one of which is attached to a free node, and at least one other end which is unattached to a node wherein one of the first and second surfaces has a greater number of free nodes per unit area of the surface than the other of the first and second surfaces.

15. The porous fluoropolymer membrane of claim 14 comprising a first surface, a second surface, fibrils, and free nodes, wherein one of the first and second surfaces has longer fibrils and a greater number of free nodes per unit area of the surface than the other of the first and second surfaces.

16. The porous fluoropolymer membrane of claim 14, having a $K_L$ (IPA) of about 80 psi (about 551.5 kPa) or less.

17. A process for splitting a fluoropolymer membrane comprising:
   a) providing an expanded fluoropolymer membrane having nodes and fibrils and having a first surface and a second surface and a thickness;
   b) bonding at least a portion of the first and/or second surface of the fluoropolymer membrane to a first and/or a second support;
   c) pulling or peeling the first support, the second support, or the first or second supports apart so that the fluoropolymer membrane splits in a dimension different from its thickness dimension to provide a fluoropolymer membrane having a third surface and a fourth surface.

18. The process of claim 17, further comprising separating the fluoropolymer membrane having a third surface and a fourth surface from the first or second support.

19. The process of claim 17, further comprising:
   (d) bonding at least a portion of the third or fourth surface of the fluoropolymer membrane from (c) to a third or fourth support; and
   (e) pulling or peeling the third support, the fourth support, or the third and fourth supports apart so that the fluoropolymer membrane from (d) splits in a dimension different from its thickness dimension.

20. The process of claim 17, wherein the fluoropolymer membrane is a PTFE membrane.

21. The membrane prepared by the process of claim 17, wherein the membrane has free fibrils at its surface.

* * * * *